June 16, 1925.  C. FATH  1,542,686
NONSKID CHAIN ATTACHMENT
Filed Sept. 19, 1922
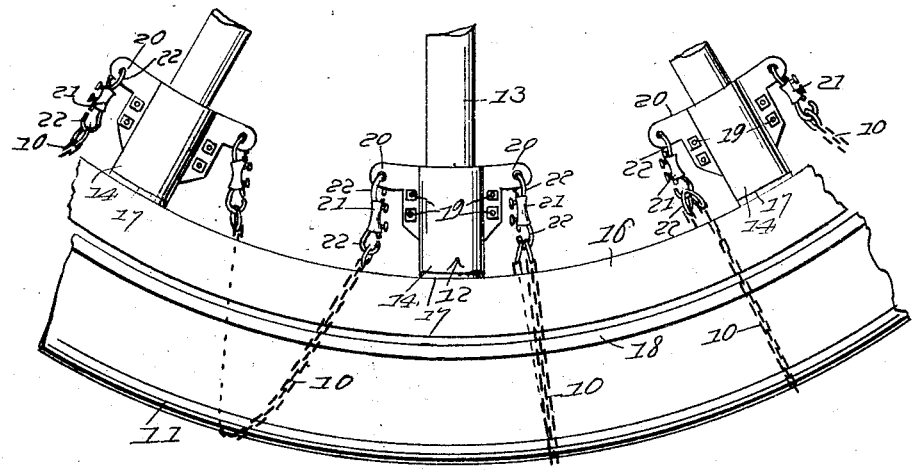
Fig. 1.
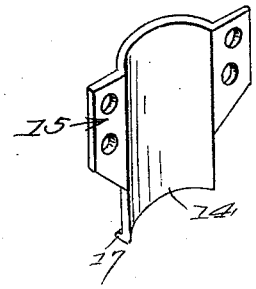
Fig. 2.
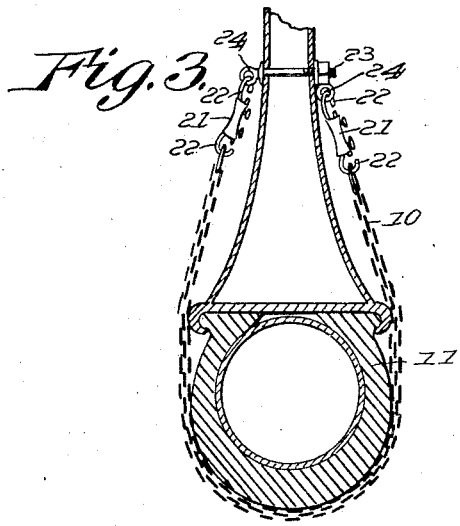
Fig. 3.
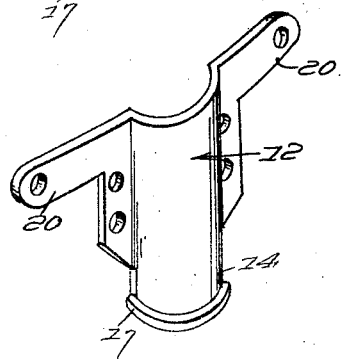
Inventor
Charles Fath.
By
Attorney Patented June 16, 1925.

1,542,686

UNITED STATES PATENT OFFICE.

CHARLES FATH, OF CANTON, OHIO.

NONSKID-CHAIN ATTACHMENT.

Application filed September 19, 1922. Serial No. 589,169.

*To all whom it may concern:*

Be it known that CHARLES FATH, a citizen of the United States of America, residing at Canton, in the county of Stark and State of Ohio, has invented new and useful Improvements in Nonskid-Chain attachments, of which the following is a specification.

The object of the invention is to provide a relatively simple construction of anti-skid chains for inflatable and other rubber tires such as are used upon motor-driven vehicles and particularly upon the driving wheels thereof, and more especially to provide a device for the purpose indicated which may be applied with greater facility than the commercial forms of anti-skid chains and is adapted without modification in dimensions to be applied to wheels of different diameters; and with this object in view the invention consists in a construction and combination of parts of which a preferred embodiment is shown in the accompanying drawings, wherein:—

Figure 1 is a side view of a vehicle wheel equipped with an anti-skid chain constructed in accordance with the invention.

Figure 2 is a perspective view of the two elements of the anchor ring clamp.

Figure 3 is a cross sectional view of a wheel of the disk type showing a chain element constructed in accordance with the invention applied in the operative position thereto.

The chain consists of a series of independent looped elements 10 adapted for transversely spanning the tire 11 at suitable intervals which are optional with the operator but are preferably determined by the number of spokes in the wheel to which the device is applied and in connection therewith there is employed a series of clamps or anchoring members 12 which are respectively engageable with the spokes 13 of the wheel. In the construction illustrated each spoke clamp consists of the outer and inner members 14 and 15 adapted for arrangement in contact respectively with the outer and inner surfaces of the spokes adjacent to the felly 16, with the lower edges provided with inturned lips 17 to bear upon the felly, said members 14 and 15 being secured together for example by means of bolts 19, and one of said members having circumferentially extending arms 20 for the attachment of the chain elements. Each chain element is provided with a link 21 having terminal snap hooks 22 for respective engagement with the extremities of the looped chain element and the eye in the adjacent arm 20.

The clamps may either be applied when required or may be permitted to remain permanently on the wheel in which latter event it is only necessary in applying the chain to snap the connecting links into engagemet with the eyes at the extremities of the arms 20 at such intervals as may be deemed necessary by the operator, the loop of each element being disposed in transversely spanning relation with the tire and being capable of a limited movement sufficient to avoid chafing the tire while affording the necessary tractive effect.

In applying the device to a wheel of the disk type as indicated in Figure 3 anchor bolts 23 may be extended through the disk with eyes 24 respectively on the head and nut of the bolt for engagement by the inner snap hooks of the links 21, but obviously in its application to the device it is necessary to have a link at each end of the chain element whereas in applying the device to a spoked wheel a single link is sufficient for engaging both ends of the looped chain element to the anchor clamp.

The preferred method of the application of the chains is to alternately connect the chains respectively between adjacent clamps, the intervening chains being connected both ends to the same clamp; or every third chain may be connected to adjacent clamps so as to span the tread of the tire diagonally, this diagonal arrangement operating to preclude side skidding. The preferred method of attachment is fully illustrated in Figure 1.

Having described the invention, what is claimed as new and useful is:

A wheel attachment for retaining chain sections in position upon a tire comprising a pair of clamp members each having an intermediate concaved portion provided at its outer end with an outstanding lip, the concaved portions adapted to receive a spoke between them and the lips adapted to bear against the felly of the wheel when the device is applied, the clamp members being provided at the side edges of the concaved portions with outstanding flanges adapted to receive securing devices, whereby the concaved portions are drawn in close contact with the surface of the spoke, the flanges upon one of the clamp members being provided at their inner ends with outstanding arms disposed at right angles to the longitudinal dimension of the concaved portion and uniformly spaced from the lip, and means provided upon the arms for connection with chain sections.

In testimony whereof he affixes his signature.

CHARLES FATH.